2,737,535

PRODUCTION OF AROMATIC HYDROCARBONS FROM FURANS

Arthur William Charles Taylor, David Gwyn Jones, and Morag Lauchlan Noble, Norton-on-Tees, England, assignors to Imperial Chemical Industries Limited, a corporation of Great Britain No Drawing. Application December 27, 1951, Serial No. 263,684

Claims priority, application Great Britain January 17, 1951

4 Claims. (Cl. 260—668)

This invention relates to the production of aromatic hydrocarbons.

According to the present invention, there is provided a process for the production of aromatic hydrocarbons, which comprises the step of contacting at least one hydrogenated furan derivative selected from the group consisting of dihydro- and tetrahydrofuran derivatives having structures:

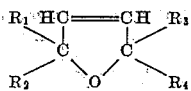

and

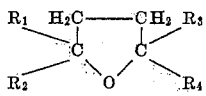

in which $R_1$, $R_2$, $R_3$ and $R_4$ are selected from hydrogen, methyl, ethyl, n-propyl and isopropyl, said derivative containing at least six carbon atoms, in the vapour phase, and at a temperature within the range of 300° to 750° C. with a catalyst, as hereinafter defined.

Catalysts suitable for use in the process of the present invention are those normally employed in aromatisation reactions. Those comprising metals of group VIII of the periodic system, and the oxides of chromium, molybdenum and vanadium are particularly suitable. These may be employed in conjunction with metallic oxides, such as alumina and magnesia. Preferred catalysts are chromic oxide-alumina, and supported platinum catalysts, such as platinum on charcoal.

A chromic oxide-alumina catalyst may be produced by dehydrating alumina trihydrate, $Al_2O_3.3H_2O$, at a temperature of 400° C. until the product contains from 9 to 11% by weight of water. The product is pelleted using a suitable pelleting lubricant, subsequently heated if necessary at a temperature of 700° C. to remove this lubricant if its presence is undesirable, and the pellets are then soaked in a solution of chromic acid until they acquire the desired chromium content. They are then dried at an elevated temperature of, for example, 400° C. The chromium oxides content of the final catalyst is preferably 10 to 15% by weight. It is also advantageous to incorporate a minor amount of magnesium chromate into the catalysts; a suitable amount is 2% by weight, expressed as the percentage by weight of MgO in the final catalyst.

The reaction is carried out by contacting the hydrogenated furan derivative with the catalyst maintained at an elevated temperature within the range of 300° to 750° C. The optimum temperature depends upon the catalyst employed; in particular, when the catalyst comprises chromic oxide-alumina, the temperature employed is preferably in the region of 500° C.

The process of the present invention is preferably carried out by continuous operation. The vaporised furan derivative is preferably contacted with the catalyst at a space velocity within the range of 0.01 to 1 litre of liquid furan compound per hour per litre of catalyst-filled space.

The process may be carried out in the presence of a carrier gas such as nitrogen or hydrogen. This may be achieved, for example, by passing a stream of hydrogen through the reaction vessel together with the vaporized hydrogenated furan derivative.

According to an important embodiment of the present invention, xylene hydrocarbons, and more particularly para-xylene, are produced by contacting 2,2,5,5-tetramethyl tetrahydrofuran or 2,2,5,5-tetramethyl-2,5-dihydrofuran, or a mixture thereof, with a catalyst, as hereinbefore defined, at a temperature within the range of 300° to 750° C. By operating in this manner, high pass yields of para-xylene may be obtained.

When working in the presence of added hydrogen using 2,2,5,5-tetramethyl 2,5-dihydrofuran as the starting material, it should be noted that in the reactor this may be hydrogenated to 2,2,5,5-tetramethyltetrahydrofuran prior to the production of xylenes. The present invention therefore covers the direct conversion of 2,2,5,5-tetramethyl 2,5-dihydrofuran to para-xylene and the conversion when it takes place via the formation of 2,2,5,5-tetramethyl tetrahydrofuran as an intermediate.

In the process of the present invention, aliphatic hydrocarbons may be produced in appreciable amounts. These may be recycled to the catalyst zone, whereby they may be largely converted to aromatic hydrocarbons. Thus, when 2,2,5,5-tetramethyl-2,5-dihydrofuran was contacted with a chromic oxide-alumina catalyst, maintained at a temperature of 500° C., the product contained dimethallyl, 1,1-4,4-tetramethylbutadiene, 2,5-dimethylhexane and 2,5-dimethylhexenes, in addition to the main product which was para-xylene. In an important embodiment of the process of the present invention, aliphatic hydrocarbons, produced as described above, are recycled to the catalyst zone together with a further portion of hydrogenated furan derivative. In this manner, they may be largely converted to paraxylene.

The 2,2,5,5-tetramethyl 2,5-dihydrofuran or 2,2,5,5-tetramethyltetrahydrofuran or mixtures thereof for use in the present invention may be produced by any convenient method. It is an important feature of the present invention that the initial starting material for their production is 2,5-dimethylhex-3 yne-2,5-diol, which may be produced by condensing acetone with acetylene in the presence of potassium hydroxide or a potassium alkoxide. This ynediol may be hydrogenated to 2,5-dimethylhex-3 ene-2,5-diol or 2,5-dimethylhexane-2,5-diol, or a mixture thereof. The diol-containing product may then be dehydrated to 2,2,5,5-tetramethyl 2,5-dihydrofuran or 2,2,5,5-tetramethyl tetrahydrofuran or a mixture thereof. Suitable dehydrating agents are phosphoric acid, sulphuric acid, hydrochloric acid, zinc chloride, acetic anhydride, preferably containing a small amount of sulfuric acid, and p-toluene sulphuric acid. Thus, the diol may be contacted with phosphoric acid containing in the region of 60% by weight of $H_3PO_4$ at a temperature of, for example, 100° C. When using hydrochloric acid, a normal solution of this is suitable, and on reacting this with the diol at 50° C., a water-insoluble upper layer is produced in the reaction product, and this comprises substantially pure 2,2,5,5-tetramethyl 2,5-dihydrofuran and/or 2,2,5,5-tetramethyl tetrahydrofuran.

EXAMPLE 1

A mixture containing 55.9 grams of 2,5-dimethylhex-3-ene-2,5-diol and 15.7 grams of 2,5-dimethylhexane-2,5-diol was heated with 650 mls. of phosphoric acid, containing 56% by weight $H_3PO_4$. A mixture of 2,2,5,5-tetramethyldihydrofuran and 2,2,5,5-tetramethyltetrahydrofuran, weighing 57.2 grams, was obtained.

41.4 grams of this mixture were fractionated; the following fractions were obtained:

| Fraction | B. Pt., °C. | Weight, grams | Composition |
|---|---|---|---|
| 1 | 102 | 18.9 | Substantially pure 2,2,5,5-tetramethyl-2,5-dihydrofuran. |
| 2 | 107–110.5 | 8.1 | A mixture of 2,2,5,5-tetramethyl tetrahydrofuran, and 2,2,5,5-tetramethyl dihydrofuran. |
| 3 | 111–112 | 9.1 | 2,2,5,5-tetramethyl tetrahydrofuran, containing 10 to 20% 2,2,5,5-tetramethyl-2,5-dihydrofuran. |

The 2,2,5,5-tetramethyl-2,5-dihydrofuran prepared in this example had $n_D^{25}=1.4039$ and $n_D^{20}=1.4064$.

75.1 grams of 2,2,5,5-tetramethyl 2,5-dihydrofuran, produced by the process described above, were passed at a rate of 22.5 mls./hour over 375 mls. of a chromic oxide-alumina catalyst maintained at a temperature of 500° C. The chromic oxide-alumina catalyst contained 13% by weight of chromium oxides, 85% by weight of activated alumina, and 2% by weight of magnesium oxide, present as magnesium chromate. Hydrogen was passed through the reaction zone at a rate of 3 litres/hour.

63.6 grams of liquid product were obtained. This, on analysis by fractional distillation and infra-red investigation, was found to contain:

```
                                                  Grams
p-Xylene ----------------------------------------- 31.0
Other aromatic hydrocarbons ---------------------- 0.55
Dimethallyl -------------------------------------- 1.1
1,1,4,4-tetramethylbutadiene --------------------- 4.4
2,5-dimethylhexane and 2,5-dimethylhexenes ------- 17.6
Water -------------------------------------------- 8.9
```

Thus, the total pass yield of aromatic hydrocarbons was 50%, and these aromatics contained 98% by weight of p-xylene. The total pass yield of aliphatic hydrocarbons containing the carbon skeleton:

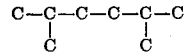

was in the region of 36%. Since these aliphatic hydrocarbons may be recycled, and thus converted in good yield to p-xylene, the total yield of p-xylene can exceed 80%.

EXAMPLE 2

59 grams of 2,5-dimethylhexane-2,5-diol were distilled with 580 mls. of phosphoric acid containing 60% by weight $H_3PO_4.2,2,5,5$-tetramethyl tetrahydrofuran and water distilled over. The water was returned to the distillation flask to maintain the phosphoric acid concentration at a constant value. 47.4 grams of crude 2,2,5,5-tetramethyl tetrahydrofuran were obtained, and on fractionation, 44.3 grams of pure 2,2,5,5-tetramethyl-tetrahydrofuran were isolated, corresponding to a yield of 86%.

The 2,2,5,5-tetramethyl tetrahydrofuran obtained in the process contained 74.8% by weight carbon, and 12.6% hydrogen. These figures are in close agreement with the theoretical values of 75.0 and 12.5% respectively. The sample had a boiling point of 112° C., and $n_D^{25}=1.4015$. These properties are not in agreement with those hitherto reported in the literature, but the sample had a Raman spectrum which was in complete accordance with it being 2,2,5,5-tetramethyl tetrahydrofuran.

40.2 grams of 2,2,5,5-tetramethyl tetrahydrofuran (boiling point 112° C.; $n_D^{25}=1.4015$) were passed over 100 mls. of ⅛″ pellets of a chromic oxide on alumina catalyst, comprising 13% by weight of oxides of chromium, 2% by weight of magnesia (present as magnesium chromate) and 85% by weight of alumina. The reaction was carried out using a liquid space velocity of 0.1 litre of feed per hour per litre of catalyst-filled space. The operating temperature was 550° C., and 5 litres of hydrogen were passed per hour through the reaction zone.

The product from this reaction comprised 4.5 litres of gas (apart from hydrogen fed), 4 grams of water, and 25.8 grams of organic liquid. On distillation, this gave the following fractions:

| Fraction | Boiling Point, °C. | Weight, grams |
|---|---|---|
| 1 | 96–106 | 3.0 |
| 2 | 106–139 | 8.6 |
| 3 | 139 | 10.6 |
| Residue | | 3.6 |

Fraction 3 was found to be substantially pure para-xylene.

These fractions were analysed by the application of the infra-red technique. The table below summarises the results obtained.

A. Aromatic hydrocarbons identified

| Product | Percent by weight of total liquid product | Weight (Grams) | Percent by weight of total aromatic product | Percent Pass Yield |
|---|---|---|---|---|
| o-Xylene | 1 | 0.3 | 2 | 0.8 |
| m-Xylene | 3 | 0.8 | 6 | 2.4 |
| p-Xylene | 44 | 11.4 | 88 | 34.2 |
| Toluene | 2 | 0.5 | 4 | 1.7 |

B. Aliphatic hydrocarbons identified

| Product | Percent by weight of total liquid product | Weight (Grams) | Percent by weight of total non-aromatic product | Pass Yield, percent |
|---|---|---|---|---|
| Dimethallyl | 3.5 | 0.9 | 7.0 | 2.6 |
| 1,1,4,4-Tetramethylbutadiene | 5 | 1.3 | 10.3 | 3.8 |
| 2,5-Dimethylhexane | 6 | 1.55 | 12.3 | 4.2 |
| Unidentified material | 35 | 8.9 | 70.0 | |

Infra-red analysis indicated that the unidentified material had a carbon structure of the type present in 2,5-dimethyl hexane.

EXAMPLE 3

A mixture of 15.7 gm. of 2,2,5,5-tetramethyl-2,5-dihydrofuran and 17.0 grams of 2,2,5,5-tetramethyltetrahydrofuran was passed at a space velocity of 0.1 litre of liquid mixture per hour per litre of catalyst-filled space over a chromic oxide on alumina catalyst maintained at a temperature of 500° C. The liquid product obtained weighed 28.3 grams, and contained:

| | Weight, grams | Pass yield, percent |
|---|---|---|
| Toluene | 0.3 | 1 |
| Dimethallyl | 1.7 | 6 |
| p-Xylene | 7.65 | 28 |
| 1,1,4,4-tetramethylbutadiene | 13.2 | 46 |
| 2,5-dimethylhexane + 2,5-dimethylhexenes | 4.45 | 15 |

Thus, 67% of the mixture fed to the reaction zone is converted to aliphatic hydrocarbons which may be recycled to the conversion zone, and converted in high yields to aromatic hydrocarbons. The conversion of the starting material to other products is 33%; of these other products, 84% is para-xylene.

We claim:

1. A process for the production of hydrocarbon mixtures comprising para-xylene which comprises the step of contacting at least one hydrogenated furan derivative selected from 2,2,5,5-tetramethyl-2,5-dihydrofuran and 2,2,5,5-tetramethyltetrahydrofuran in the vapour phase and at a temperature within the range of 300° to 750° C. with a catalyst consisting essentially of an effective amount of chromic oxide and alumina.

2. A process for the production of hydrocarbon mixtures comprising para-xylene which comprises the step of contacting at least one hydrogenated furan derivative selected from 2,2,5,5-tetramethyl-2,5-dihydrofuran and 2,2,5,5-tetramethyltetrahydrofuran in the vapour phase and at a temperature within the range of 300° to 750° C. with a catalyst consisting essentially of an effective amount of platinum supported on charcoal.

3. A process for production of hydrocarbon mixtures comprising para-xylene which comprises the step of contacting 2,2,5,5-tetramethyl-2,5-dihydrofuran in the vapour phase and at a temperature within the range of 300° to 750° C. with a catalyst consisting essentially of an effective amount of chromic oxide and alumina.

4. A process for the production of hydrocarbon mixtures comprising p-xylene which comprises the step of contacting at least one hydrogenated furan derivative selected from the group consisting of 2,2,5,5-tetramethyl-2,5-dihydrofuran and 2,2,5,5-tetramethyltetrahydrofuran in the vapour phase and at a temperature within the range of 300° to 750° C. with an aromatization catalyst comprising an effective amount of a catalytically active material selected from the group consisting of metals of group VIII of the periodic system and oxides of chromium, molybdenum and vanadium.

References Cited in the file of this patent

UNITED STATES PATENTS

| | | |
|---|---|---|
| 2,157,365 | Vaughn | May 9, 1939 |
| 2,241,792 | Reppe et al. | May 13, 1941 |
| 2,250,445 | Bruson et al. | July 29, 1941 |
| 2,273,484 | Guinot | Feb. 17, 1942 |
| 2,302,345 | Pesta et al. | Nov. 17, 1942 |
| 2,310,809 | Reppet et al. | Feb. 9, 1943 |

OTHER REFERENCES

Slobodin et al.: Chem. Abst., 43 (1949), col. 1017–8 (1 page only).